United States Patent

[11] 3,620,308

| [72] | Inventor | John G. Christopher |
| | | Grinnell, Iowa |
| [21] | Appl. No. | 856,692 |
| [22] | Filed | Sept. 10, 1969 |
| [45] | Patented | Nov. 16, 1971 |
| [73] | Assignee | J. I. Case Company |
| | | Racine, Wis. |

[54] TOWING MEANS FOR AGRICULTURAL IMPLEMENT
1 Claim, 7 Drawing Figs.

[52] U.S. Cl. .................................................. 172/248,
172/625, 172/677, 280/34
[51] Int. Cl. .......................................................... A01b 23/04
[50] Field of Search ............................................ 172/240,
248, 310, 311, 439, 452, 456, 625, 654, 669, 677,
679, 776, 44; 280/411, 412, 413, 415, 34; 56/228

[56] References Cited
UNITED STATES PATENTS

| 1,872,121 | 8/1932 | Christensen .................. | 172/625 |
| 1,941,539 | 1/1934 | Court et al. .................... | 172/625 |
| 2,696,772 | 12/1954 | Underdown .................. | 172/625 |
| 3,288,480 | 11/1966 | Calkins et al. ................ | 172/44 |
| 2,341,807 | 2/1944 | Olmstead et al. ............. | 172/439 |
| 2,979,136 | 4/1961 | Oehler et al. .................. | 172/679 |
| 2,996,307 | 8/1961 | Debailleaux .................. | 172/240 |
| 3,056,458 | 10/1962 | Gray .............................. | 172/439 |
| 3,240,005 | 3/1966 | Rowse ........................... | 172/310 |
| 3,410,234 | 11/1968 | Peifer ........................... | 172/456 |
| 3,422,909 | 1/1969 | Jacobs ........................... | 172/456 |
| 3,511,318 | 5/1970 | Boetto et al. .................. | 172/248 |

FOREIGN PATENTS

| 1,004,531 | 3/1952 | France .......................... | 280/411.1 |
| 51,476 | 1/1968 | Germany ....................... | 172/240 |

*Primary Examiner*—Robert E. Pulfrey
*Assistant Examiner*—C. W. Hanor
*Attorney*—Arthur J. Hansmann ABSTRACT: An agricultural implement, such as a cultivator, having a frame and two draft means or tongues. One of the tongues serves to move the implement in one direction during operation, and the other of the tongues serves to move the implement in another direction during transport. Transport wheels are affixed to the implement and are offset relative to the main frame of the implement. Accordingly, the second draft means is swingable on the frame and between a lowered position for transport, and aligned on the vertical plane centrally of the wheels when the draft means is in the downwardly swung position. The draft means is also swung upwardly to the inoperative position to overlie the implement.

PATENTED NOV 16 1971 3,620,308
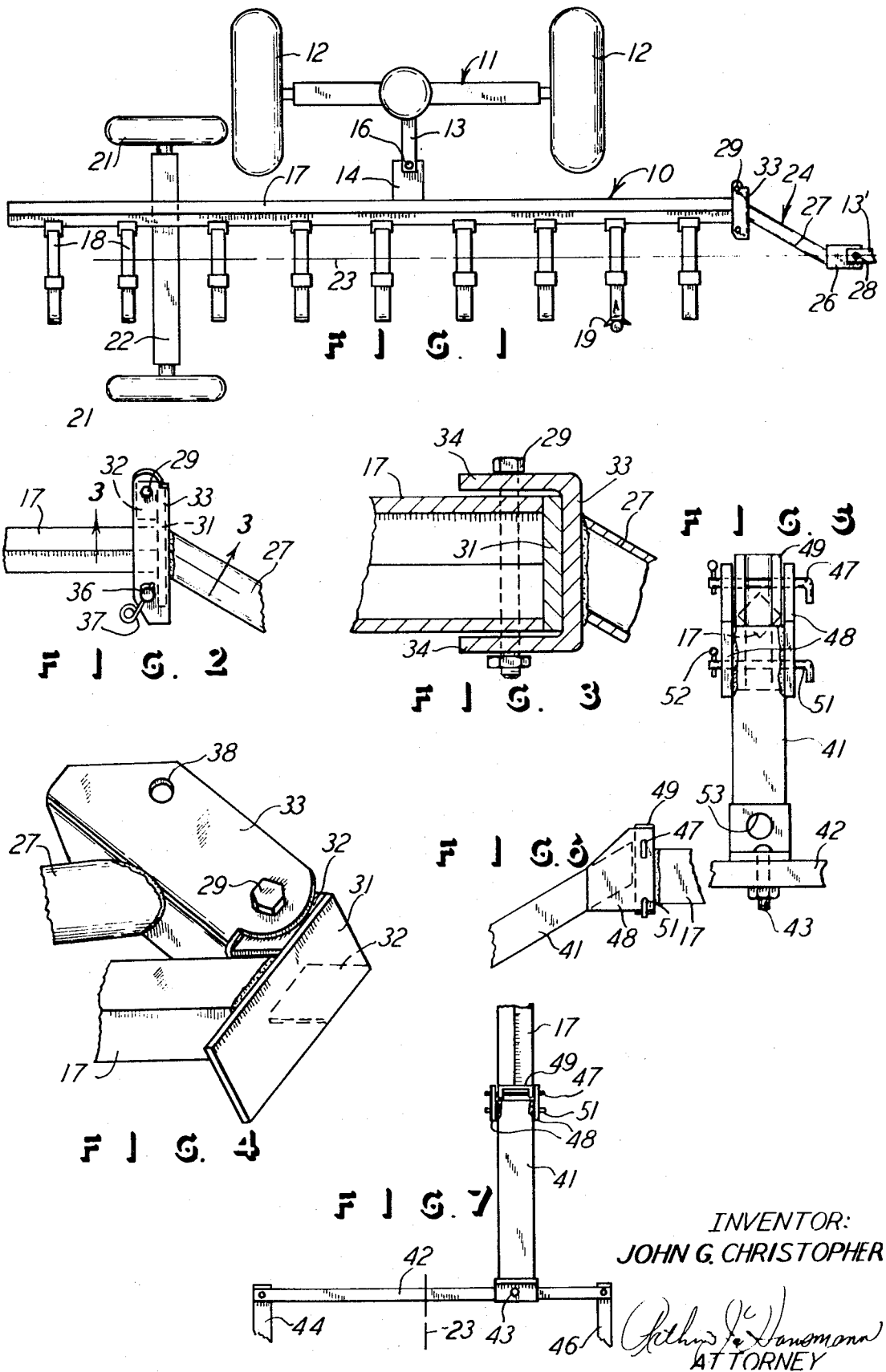
INVENTOR:
JOHN G. CHRISTOPHER
ATTORNEY

TOWING MEANS FOR AGRICULTURAL IMPLEMENT

This invention relates to an agricultural implement of the type which is towed by a tractor, both for operating the implement and for transporting the implement when it is not operating. More particularly, the invention pertains to an implement having an elongated frame with a plurality of tools mounted along the frame which extends for a width too great for the implement to be transported along a road or through a gate. Therefore, the implement has a transport draft means or tongue which permits the implement to be towed in a direction along the length of the elongated implement frame, for the transport purpose.

BACKGROUND OF THE INVENTION

Agricultural implements having two draft means or tongues, one for operation and one for transport of the implement, are very well known in the art. These implements are generally very wide in that their frame extends across the path of the direction of operating the implement, and the frame is therefore elongated to extend well beyond the width of the towing tractor. Such wide implements present a problem of transporting the implement when the implement is not in use, but it is only desired that it be moved along a narrow passageway. To accomplish this, these implements are commonly provided with transport wheels which permit inoperative or transport movement of the implement in the direction transverse to their normal operating direction, so that the narrower dimension of the implement is presented in the transport position. Further, these implements are commonly provided with transport tongues affixed to the implement toolbar or like frame and the prior art is even aware of implements having transport tongues extending angulated to the toolbar so that the tractor hitch end of the tongue is offset relative to the toolbar. The reason for the offset is that the transport wheels are also commonly offset relative to the toolbar or frame, so it is desired that the hitch end of the transport tongue be on the vertical plane which is central of the transport wheels.

The problem with the transport tongue of the prior art implements is that the tongue must be either permanently extended to its desired position for hitching to a towing tractor, or the tongue must be connected and disconnected relative to the implement frame and by means of cumbersome connectors. Of course where the prior art tongue is permanently connected to the implement frame, it is desired that the hitch end of the tongue extend downwardly to the elevation of the tractor drawbar, and this elevation is too low to make it practical for using the implement during operation. Therefore, it is desirable to have a transport tongue which is moveable between its lowered transport position and a raised nontransport or inoperative position. The present invention provides a transport tongue or draft means on an agricultural implement, and with the tongue being readily moveable between its operative and inoperative positions. In accomplishing this object, no special tools, even including wrenches, or the like, are required, but the tongue is nevertheless desirably secured in its lowered transport position, and the tongue is also secured in its raised inoperative position.

Still further, the present invention provides an arrangement for a draft means or tongue on an implement and wherein the extending end of the tongue at its point of attachment to the tractor is swingable from a raised inoperative position to a lowered position for attachment to a tractor, and with the hitch connection on the tongue being symmetrical or aligned with the implement transport wheels, when the tongue is in the transport or lowered position. This provides a balanced towing to the implement so that it can be towed directly behind the tractor, even though the transport wheels are offset relative to the elongated frame of the implement.

Still further objects of this invention are to accomplish the aforementioned objectives and to do so with a draft means which is sturdy, easily positioned between the operative and inoperative positions, relatively inexpensive, and readily positionable between the two positions. These particular objects are significant when it is remembered that the draft means is provided for a heavy implement, such as the agricultural implement, and it must therefore be arranged to withstand the usual stress and strain of heavy implements.

BRIEF DESCRIPTION OF THE DRAWINGS

FIG. 1 is a plan view of a cultivator implement and with a fragment of a tractor attached thereto in the operating position, and with one embodiment of this invention.

FIG. 2 is an enlarged fragment of FIG. 1.

FIG. 3 is an enlarged sectional view taken on the line 3—3 of FIG. 2.

FIG. 4 is an enlarged view of a fragment of the embodiment shown in FIG. 1, and with the parts in a different position.

FIG. 5 is a front elevational view of another embodiment of the invention attachable to the implement shown in FIG. 1.

FIG. 6 is a side elevational view of a fragment of FIG. 5.

FIG. 7 is a top plan view of FIG. 5 and with the tractor drawbars added thereto.

DETAILED DESCRIPTION OF THE PREFERRED EMBODIMENTS

FIG. 1 shows an agricultural implement 10 in operative towing position relative to a fragmentarily shown tractor 11. The tractor rear wheels 12 and drawbar 13 are also shown, and the implement draft means or tongue 14 is connected to the tractor drawbar 13 by means of a pin 16. It will of course be understood that the tongue 14 has its extending end receiving the hitch pin 16 and disposed at a low elevation for matching with the elevation of the tractor drawbar 13. The implement also includes a frame, incorporating the elongated toolbar 17 which has a plurality of tools 18 spaced therealong, as indicated and as commonly done in the art. The tools 18 may be supporting cultivators, such as the cultivator 9, and it will be understood that the implement 10 is therefore moving in the direction of the tractor wheels 12 when the implement is in the operating position.

The implement 10 also has transport wheels 21 suitably mounted on the implement frame by means of the shown bar 22. It will be noted that the wheels 21 are horizontally offset relative to the vertical plane along the toolbar 17 and, in fact, the dot-dash line designated 23 is indicating a center plane relative to the transport wheels 21, and such plane is vertical and is of course offset relative to the implement frame or toolbar 17. With the offset transport wheels 21, the remainder of the implement 10 is balanced equally on the wheels 21, as desired. However, when the implement 10 is to be moved in the transport function, then the tractor 11 is moved to one end of the elongated frame or toolbar 17, such as having the tractor drawbar 13 in the position indicated 13'. Therefore, in the transport of the implement 10, the tractor drawbar is centrally located relative to the transport wheels 21 for balanced towing of the implement 10.

To accomplish this, FIG. 1 shows that the implement 10 has a second draft tongue or means designated 24. The means 24 is shown angulated in the plan view of FIG. 1, and, in fact, the means 24 is also angulated in the elevational view shown in FIG. 2. The result is that the extending end of the draft means 24 has a towing connection hitch 26 affixed to the draft means piece 27. A hitch pin 28 connects the tractor drawbar 13 and the towing connection hitch 26 for the transport towing of the implement 10. It will now be understood and seen that the connecting pin 28 is on the center plane designated 23, as desired.

It is also desired that the tongue piece 27 be swung to an inoperative and out-of-the-way position when it is not being used for transport towing of the implement 10. A pivot pin 29 connects the draft means 24 to the toolbar 17 for the up-and-down swinging motion. Thus it will be seen and understood that the axis of the pivot pin 29 is at an angle relative to both the vertical and horizontal planes, so the piece 27 swings downwardly to the central position shown in FIG. 1. Also, the piece 27 swings upwardly to an inoperative position to overly the toolbar 17, such as indicated in the upwardly swung position shown in FIG. 4.

A plate 31 is affixed to the end of the toolbar 17 and carries a support 32 which receives the pivot pin 29, and such pin is shown in the form of a bolt. Also, a U-shaped bracket 33 is affixed to the end of the piece 27 and also receives the bolt 29. It will of course be understood that the bolt 29 therefore extends through the upper and lower legs of the U-shaped piece 33, and such legs are shown and designated 34 in FIG. 3, and the pin 29 also extends through the shown plate 32 and another plate 32 which is on the lower edge of the upright plate 31 and is indicated in dotted lines in FIG. 4.

A pin 36 extends between the bracket legs 34 and behind the plate 31 to releasably secure the draft means 24 in the transport position shown in FIGS. 1 and 2. A holding pin 37 extends through the pin 36 and can be removed therefrom for removing the pin 36 from the bracket 33 to permit swinging the draft means 27 to the position shown in FIG. 4. Thus the pin 36 is removable in the two holes in the legs 34, such as the shown hole 38 in FIG. 4. It will therefore be understood that the pins 29 and 36 rigidly hold the tongue 24 relative to the toolbar 17 when the tongue or draft means 24 is in its lowered or transport position.

FIGS. 5, 6, and 7 show another embodiment of the invention, and this embodiment is also attachable to the toolbar 17. In this instance, the draft means or tongue 41 is also swingably mounted on the toolbar 17 for up-and-down movement of a towing connection hitch 42. In this instance, the hitch 42 is an elongated bar which is pivotally attached to the extending end of the tongue 41 by means of a pin 43. FIG. 7 then also shows that the tractor is different from that indicated in FIG. 1 in that the tractor has two drawbars 44 and 46 which are spaced apart but centered with the unshown tractor. That is, the central plane 23 of the implement 10 is essentially along the center of the bar 42, as shown in FIG. 7, for balanced transport towing of the implement 10, as is discussed in connection with the other embodiment.

A pivot pin 47 extends through two spaced-apart plates 48 affixed to the tongue 41 and being a part thereof, and the pin 47 also extends through a U-shaped bracket 49 affixed to the toolbar 17. Therefore, the pin 47 is disposed on a horizontal plane, and the tongue 41 therefore pivots and swings along a vertical plane and between the lower operative or transport position and the raised inoperative position where the tongue 41 is overlying the toolbar 17. A pin 51 likewise extends through the plates 48 and the bracket 49 to secure the tongue 41 in its lowered position, similar to the function to the pin 36 in the other embodiment. The pin 51 is releasable, and a releasing pin 52 extends through the latching pin 51 for releasably holding the pin 51 in its shown position.

In both embodiments, it will therefore be understood that the implement 10 is towed by a force applied at the plane which is centrally intermediate the wheels 21, and the towing connection hitch 26 and 42 of the respective embodiments are low and attachable to the tractor drawbar or drawbars, as the case may be. Further, FIG. 5 shows that the tongue 41 has an opening 53, and the tongue 41 is therefore actually hollow and can receive the towing connection hitch 42 when the draft means 41 is in the inoperative position overlying the toolbar 17, if such stowed position of the towing connection hitch 42 is desired.

What is claimed is:

1. In an agricultural implement of the type towed by a tractor having a drawbar, an implement frame having a horizontally oriented longitudinal axis and being arranged to be towed in a first direction relative to said longitudinal axis for operating the implement on the ground, a first draft means on said implement frame for towing the latter in said first direction, a second draft means on said implement frame and extending therefrom for towing the latter in a direction transverse to said first direction, a towing connection hitch on the extending end of said second draft means for connecting with said tractor, two transport ground wheels on said implement frame and facing in said transverse direction and being on opposite sides of said longitudinal axis and unequally spaced therefrom to be unequally horizontally offset from said longitudinal axis, the improvement comprising a pivot connection between said implement frame and said second draft means to have the latter up and down swingably mounted on said implement frame and with the free end of said second draft means being disposed below the horizontal level of said implement frame when in the downwardly swung position, releasable securing means operatively connected between said second draft means and said implement frame for releasably securing said second draft means in said downwardly swung position, said towing connection hitch being located on said second draft means central relative to the vertical center plane intermediate said two transport ground wheels when said second draft means is secured in said downwardly swung position, a pivot pin included in said pivot connection and swingably connecting said second draft means to said implement frame, said pivot pin having its axis at an angle to both the vertical and the horizontal for swinging said second draft means on an oblique plane which is the plane transverse to said angle and with said pivot pin axis being offset from said longitudinal axis of said implement frame to effect positioning of said second draft means overlying said implement frame when said second draft means is in the upwardly swung position.

* * * * *